United States Patent
Koellner et al.

(10) Patent No.: US 6,813,664 B2
(45) Date of Patent: Nov. 2, 2004

(54) SYSTEM TRANSMITTING DATA IN EQUIDISTANCE CYCLES USING SUCCESSIVE SYNCHRONIZATION SIGNALS FOR DETECTING AND SIGNALING ACCESS VIOLATIONS

(75) Inventors: Christoph Koellner, Regensburg (DE); Otmar Katzenberger, Baden Baden (DE); Joerg Mensinger, Karlsruhe (DE); Heinrich Rudi, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 39 days.

(21) Appl. No.: 10/355,109

(22) Filed: Jan. 31, 2003

(65) Prior Publication Data

US 2003/0200327 A1 Oct. 23, 2003

Related U.S. Application Data

(63) Continuation of application No. PCT/DE01/02852, filed on Jul. 27, 2001.

(30) Foreign Application Priority Data

Jul. 31, 2000 (DE) .......................................... 100 37 360

(51) Int. Cl.$^7$ .............................................. G06F 13/36
(52) U.S. Cl. ...................... 710/117; 710/107; 710/110; 710/58; 710/36
(58) Field of Search .............................. 710/117, 107, 710/110, 58, 36; 370/476, 235; 713/1, 300; 702/150, 78; 365/200; 340/310.03

(56) References Cited

U.S. PATENT DOCUMENTS

| | | | | |
|---|---|---|---|---|
| 4,845,466 A | * | 7/1989 | Hariton et al. | 340/310.03 |
| 5,107,439 A | * | 4/1992 | Clark | 702/78 |
| 5,532,965 A | * | 7/1996 | Kenney | 365/200 |
| 5,687,103 A | * | 11/1997 | Hagl et al. | 702/150 |
| 5,987,614 A | * | 11/1999 | Mitchell et al. | 713/300 |
| 6,421,628 B1 | * | 7/2002 | Thorsander et al. | 702/150 |
| 6,446,202 B1 | * | 9/2002 | Krivoshein et al. | 713/1 |
| 6,477,181 B1 | * | 11/2002 | Fujimori et al. | 370/476 |
| 6,711,131 B1 | * | 3/2004 | Shiobara | 370/235 |

OTHER PUBLICATIONS

Gianluca Cena, et al, "Standard Field Bus Networks for Inudstrial Applications"; Computer Standards and Interfaces, Elsevier Sequoia, Lausanne, Ch, vol. 17, No. 2, Jan. 15, 1995, pp. 155–167.

* cited by examiner

Primary Examiner—Le Hien Luu
(74) Attorney, Agent, or Firm—Sughrue Mion, PLLC

(57) ABSTRACT

A user terminal (1) having a communications processor (10) that carries out a cyclic data transmission. During a cyclic part (ZYK,x) of a cycle (Z,x) in which user data are transmitted, a DP application may not access the memory (14, 15). In the communications processor (10), the memory (14, 15) stores a process image. The communications processor (10), for the purpose of synchronization, transmits at the beginning of a cycle a cycle start interrupt (ZSI,x) and at the end of the cyclic part (ZYK,x) a cycle end interrupt (ZEI,x). Once the arithmetic unit (5, 7, 8) has accessed the memory it releases the interrupts. The duration ($\Delta T's2,1$; $\Delta T'e2,1$) between two successive interrupts serves to detect access violations and to initiate appropriate fault treatment measures.

7 Claims, 3 Drawing Sheets

1: User Terminal
3: Sensor
4: Actuator
5,7,8: Arithmetic Units
9: Drive
10: Plug-In Module 1: User Terminal
3: Sensor
4: Actuator
5,7,8: Arithmetic Units
9: Drive
10: Plug-In Module 10: Communications Processor
31: Device Driver Instance
32: DP Thread

SYSTEM TRANSMITTING DATA IN EQUIDISTANCE CYCLES USING SUCCESSIVE SYNCHRONIZATION SIGNALS FOR DETECTING AND SIGNALING ACCESS VIOLATIONS This is a Continuation of International Application PCT/DE01/02852, with an international filing date of Jul. 27, 2001, which was published under PCT Article 21(2) in German, and the disclosure of which is incorporated into this application by reference.

FIELD OF AND BACKGROUND OF THE INVENTION

The invention relates to a method for operating a user terminal in a network, and associated systems and structures, such as a user terminal for a network, a storage medium with a program, and so forth.

In network communication according to the Profibus DP specification, user data can be transmitted between master and slaves in equidistant cycles. The master is the network user that has the right to access the bus and that calls the other users, i.e. the slaves, in a polling procedure to transmit data. In equidistant operation, the transmission of user data between the master and the slaves occurs in precisely equal, i.e., equidistant cycles. The duration of a cycle can be predefined through configuration and typically amounts to a few milliseconds. In equidistant operation, high synchronicity is achieved on the bus between the master and the associated slaves, which is required, in particular, for clock synchronized drive couplings in the area of motion control.

From the Siemens manual entitled "SIMATIC NET— Programming Interface DP Base for CP 5613/CP 5614," 05/2000 edition, Order No. C79000-G8900-C139-04, a communications processor (CP) is known, which can be inserted as a plug-in module into a personal computer (PC) with a PCI bus. It can be run as a master in equidistant mode in a network according to the Profibus DP specification. The program of a DP application runs on the PC while the CP with its integrated microprocessor handles the communication via the field bus. The interface between the DP application running on the PC and the communications processor is a dual port RAM (DPR), which is arranged on and thus integrated into the plug-in module of the communications processor. This DPR stores a process image, as it were. It includes, in particular, the input, output, and diagnostic data of the slaves, as well as status and configuration data. If the DP application is reading, e.g., data of a slave from the process image and the communications processor overwrites this data with new data at the same time, the DP application might receive the first bytes of the data set of the previous DP cycle and the last bytes of the current cycle. The data would thus be corrupted and inconsistent. The rules for equidistant operation, e.g., in clock synchronous drive couplings, therefore specify that the DP application may record actual values of the slaves or specify set points to the slaves only during time segments within a cycle when no user data is being transmitted between the master and the slaves.

FIG. 2 shows a simplified representation of a cycle according to the Profibus DP specification in equidistant operation. A time axis t extends from left to right. For joint synchronization of the slaves, a global control message $GC,x-1$ is transmitted before each start of an equidistant cycle $Z,x$. Cycle Zx starts with a cyclic part $ZYK,x$, in which the user data are exchanged between master and slaves. The start and end of the cyclic part $ZYK,x$ can be indicated to the DP application in a PC by outputting a cycle start interrupt $ZSI,x$ or a cycle end interrupt $ZEI,x$. The cyclic part $ZYK,x$ is followed by an acyclic part $AZYK,x$ of the equidistant cycle $Z,x$. After the end of the acyclic part $AZYK,x$, another global control message $GC,x$ is transmitted to synchronize the slaves prior to the start of the next equidistant cycle $Z,x+1$. The start of a cyclic part $ZYK,x+1$ in the equidistant cycle $Zx+1$ (not fully depicted) can again be signaled to the DP application in the PC by another cycle start interrupt $ZSI,x+1$. The duration TDP of a cycle in equidistant operation is thus the time interval between the cycle start interrupt $ZSI,x$ and the following cycle start interrupt $ZSI,x+1$. This duration can be set when the network is configured. In a time segment TDPR, which is composed of the acyclic part $AZYK,x$ and the transmission time of the global control message $GC,x$, the DP application in the PC can access the dual port RAM of the communications processor without jeopardizing the consistency of the data sets of the process image.

The synchronization between a thread on the PC which executes the DP application (hereinafter referred to as DP thread) and the communications processor can thus be interrupt-controlled via a device driver integrated into the operating system, e.g., Windows NT. In each cycle $Z,i$ the communications processor sends a cycle start interrupt $ZSI,i$ and a cycle end interrupt $ZEI,i$ to the driver. Via mechanisms of the operating system, e.g., setting a Windows semaphore, the driver then activates the DP thread of the DP application waiting at the semaphore. Because of the multitude of operating systems and computer characteristics, e.g., CPU speed, number of installed plug-in modules, displacement effects due to task changes and priority schemes, competing operation of several drivers, etc., the time between generating the interrupt and activating the DP thread is in many cases not deterministic. As a consequence, activation of the DP application can be continuously or sporadically delayed such that access to the process image in the communications processor occurs at an unallowed instant. As a consequence of such an access violation, the data of the process image is read and updated at the wrong time from a control point of view. This can cause serious operation interruptions or damage in a process technology plant that is controlled by the field bus components of the Profibus DP network. For example, if all rolls in a rolling mill must move absolutely synchronously when steel is being processed, an incorrect adjustment could result in irregular thickness of the rolled steel.

OBJECTS OF THE INVENTION

One object of the invention is to provide an improved method for operating a user terminal in a network. Another object is to provide a user terminal in a network and a storage medium with a program for such a user terminal. A further object is to provide a user terminal that detects and signals access violations, such as those described above, during operation, so that suitable fault handling measures can be introduced.

SUMMARY OF THE INVENTION

According to one formulation, these objects are addressed by a method for operating a user terminal in a network wherein data is transmitted in equidistant cycles, the network having a user terminal with a communications processor and with an arithmetic unit that accesses memory. The method includes the communications processor performing the cyclic data transmission by (i) reading the data from a memory in a cyclic part (ZYK,x) of each of the cycles (Z,x) and transmitting the read data to other user terminals and/or (ii) receiving the data from other user terminals and writing this data into a memory; and the communications processor sending at least a first synchronization signal (16) respectively at a fixed instant (Tsx) of each cycle (Z,x) to the arithmetic unit, the arithmetic unit being configured to release the first synchronization signal. The method further includes blocking the first synchronization signal (16) after the first synchronization signal has been sent, and the arithmetic unit releasing the first synchronization signal only when the arithmetic unit fails to access the memory within the cyclic part (ZYK,x). Finally, the method includes determining a time interval ($\Delta$T'sx,x−1; $\Delta$T'ex,x−1) between two successive first synchronization signals, and detecting and signaling an unauthorized access if the time interval is greater than the duration (TDP) of each cycle (Z,x).

Other aspects of the present invention include an inventive user terminal and an inventive communications processor.

The invention has the advantage that access violations can be safely and reliably detected. The fixed instant when the communications processor sends a first synchronization signal to the arithmetic unit can in principle be selected at any point within the cycle. If this instant lies a certain time period before the start of the cyclic part of a cycle, suitable measures must be taken in the arithmetic unit to ensure that, after the synchronization signal is released again, the arithmetic unit will at most access the memory only until this time period has elapsed. Possibilities for signaling access without access authorization include a corresponding message being output to an operator panel, or a message to a fault handling routine being generated in the arithmetic unit or the communications processor, so that a controlled process can be brought to a safe state. Particularly during a test run in the development phase it is possible to take suitable countermeasures after such an access violation has been detected. For example, a faster CPU can be used in the PC, the BIOS of the operating system can be optimized, or the configured equidistant time can be increased. Since the occurrence of inconsistent data sets in a DP application are already detected at the source of the fault, suitable fault handling measures can be introduced in time to avoid any operation interruptions or damage in a process technology plant that would be caused as a result.

If the communications processor sends the first synchronization signal by outputting an interrupt to the arithmetic unit at the start of the cyclic part of a cycle, the interrupt can be simply released after the last access by the arithmetic unit to the memory in order to detect access violations reliably. Since the arithmetic unit, once the interrupt has been released, no longer accesses the memory in any case, a timely release of the interrupt means that the arithmetic unit does not access the memory during the cyclic part of a cycle. The output of an interrupt as a first synchronization signal is a proven means for event-controlled processing of sequences implemented through programming.

If the communications processor sends a second synchronization signal by outputting a second interrupt to the arithmetic unit at the end of the cyclic part of a cycle, this has the additional advantage that no parameterization of the duration of the cyclic part of a cycle is required. This eliminates the need for measuring the time from the start of the cyclic part, which could ensure, without such a synchronization signal, that the arithmetic unit does not access the memory while user data is being transmitted. The DP application of the arithmetic unit can be activated immediately when the second interrupt is received and the memory can be accessed. In this case, the arithmetic unit releases again the first interrupt and the second interrupt once it has accessed the memory. The interval between two successive interrupts of the second type can also be used to detect an access without access authorization.

BRIEF DESCRIPTION OF THE DRAWINGS

The invention and embodiments and advantages thereof will now be described in greater detail with reference to an exemplary embodiment of the invention depicted in the drawings in which.

DETAILED DESCRIPTION OF THE PREFERRED EMBODIMENTS

Figure 1:
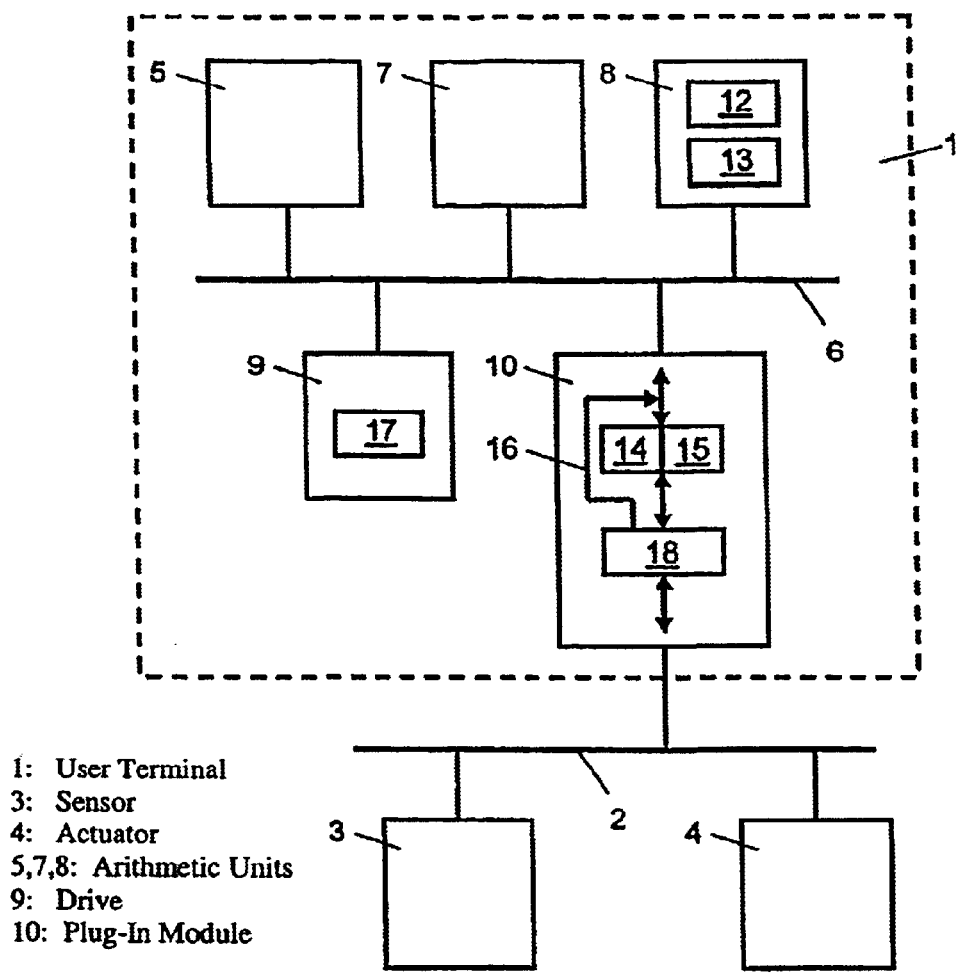
FIG. 1 is a block diagram of a network with a plurality of user terminals.

FIG. 1 shows a simplified automation system for controlling a process, which includes a personal computer 1 and a field bus 2, which is connected thereto and implemented as a Profibus DP, with a sensor 3 and an actuator 4. The personal computer 1 includes a processor 5, which is connected, via a PCI bus 6, to a working memory 7, a program memory 8 and a drive 9. For the sake of clarity, other components of the personal computer have been omitted. An operating system that is not real-time capable, e.g., Windows NT, is loaded into the personal computer. The interface between the personal computer 1 and the field bus 2 is formed by a plug-in module 10, which is inserted into the personal computer 1 and connected to the PCI bus 6. Via this plug-in module 10, which is also referred to as a communications processor, a control program 12 that runs as a DP application on the personal computer 1, can read in measured data, which is recorded by the sensor 3 on the process, and can output control commands to the actuator 4, which acts as a control element on the process. For this purpose, user data is cyclically exchanged via the field bus 2 among the connected user terminals 1, 3 and 4. The communications processor 10 forms a Profibus DP master, which cyclically calls the sensor 3 and the actuator 4, which are both operated as Profibus DP slaves, to exchange data. The DP application 12 and a device driver 13 for the communications processor 10 are loaded into the program memory 8 of the personal computer 1. During installation, the programs required to operate the arithmetic unit are loaded into the program memory 8 from a storage medium 17, which is inserted into the drive 9. The processor 5, which together with the working memory 7 and the program memory 8 forms an arithmetic unit, can access, via the PCI bus 6, memories 14 and 15 of the communications processor 10. These memories 14 and 15 are implemented preferably as dual port RAMs and store a process image. Through interrupts 16 the communications processor 10 outputs synchronization signals to the arithmetic unit.

Figure 2:
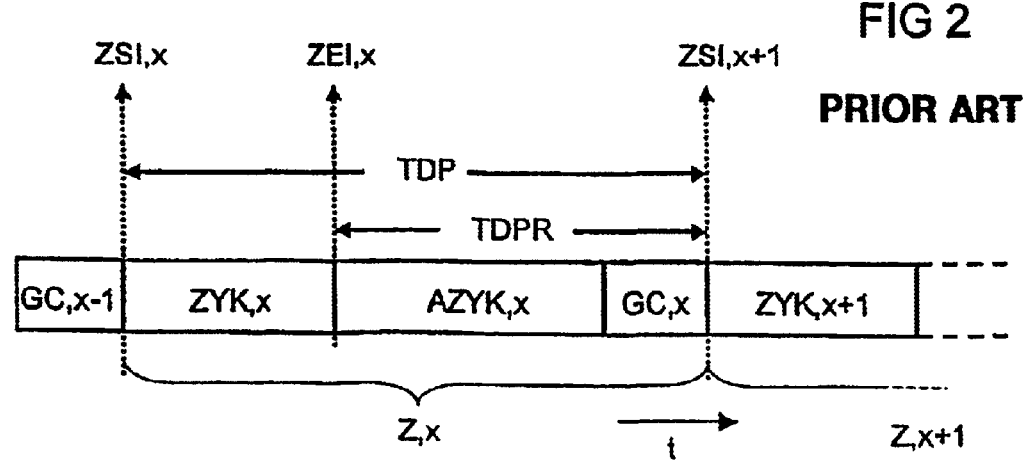
FIG. 2 is a time diagram to illustrate the conventional equidistance operation in Profibus DP.

FIG. 2 shows the time structure of a cycle Z,x in equidistant operation of Profibus DP, which has already been described in greater detail at the outset. Only in a time segment TDPR that lies outside the cyclic part ZYK,x of the cycle Z,x, may the arithmetic unit access the process image in the memories 14 and 15.

Figure 3:
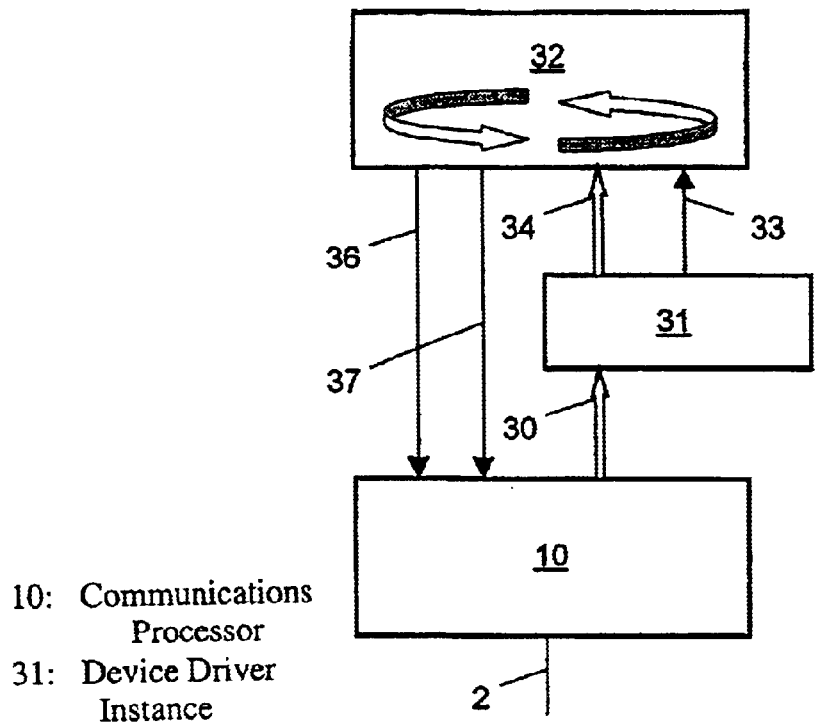
FIG. 3 is a signal flow diagram to illustrate the interaction of the components of a user terminal.

FIG. 3 shows the interaction of the individual units, or modules, which are partly implemented by software. During a cycle, the communications processor 10 outputs a cycle start interrupt and a cycle end interrupt to a device driver module 31 as indicated by arrow 30. The device driver module 31 is implemented by executing e.g. the device driver 13, which operates e.g. as a program under Windows NT. The device driver module 31 determines the time difference between the preceding and the current interrupt of the same type. It also checks this time difference for plausibility at a configured equidistant time TDP. If the time difference is greater than the configured equidistant time TDP plus a small tolerance, an access violation on the part of a DP thread 32 is present. In this case, the DP thread 32, as indicated by arrow 33 in FIG. 3, is informed of the error. In practice, unauthorized access is indicated, e.g., by incrementing an error counter in a dual port RAM, which can be cyclically polled by the DP thread 32. In the case of a cycle end interrupt, the DP thread 32 is activated by the device driver module 31 corresponding to arrow 34. This activation can be effected, for example, by setting a common Windows semaphore, where DP thread 32 waits each time after completing a control loop. As an alternative to the Windows semaphore it is of course also possible to use other methods for synchronizing program-implemented modules.

After its activation, the DP thread 32, e.g., for processing a control algorithm, accesses a process image kept in a memory area of the dual port RAM of the communications processor 10, to read in the measured data and to output the control data calculated therewith as indicated by arrow 36 and then releases again the cycle start interrupt and the cycle end interrupt of the communications processor 10. In FIG. 3, the release of the interrupt is indicated by arrow 37. The DP thread 32 then waits until the cycle end interrupt is output in the following cycle. This looping is symbolically indicated in DP thread 32 by a broken loop with arrows.

Figure 4:
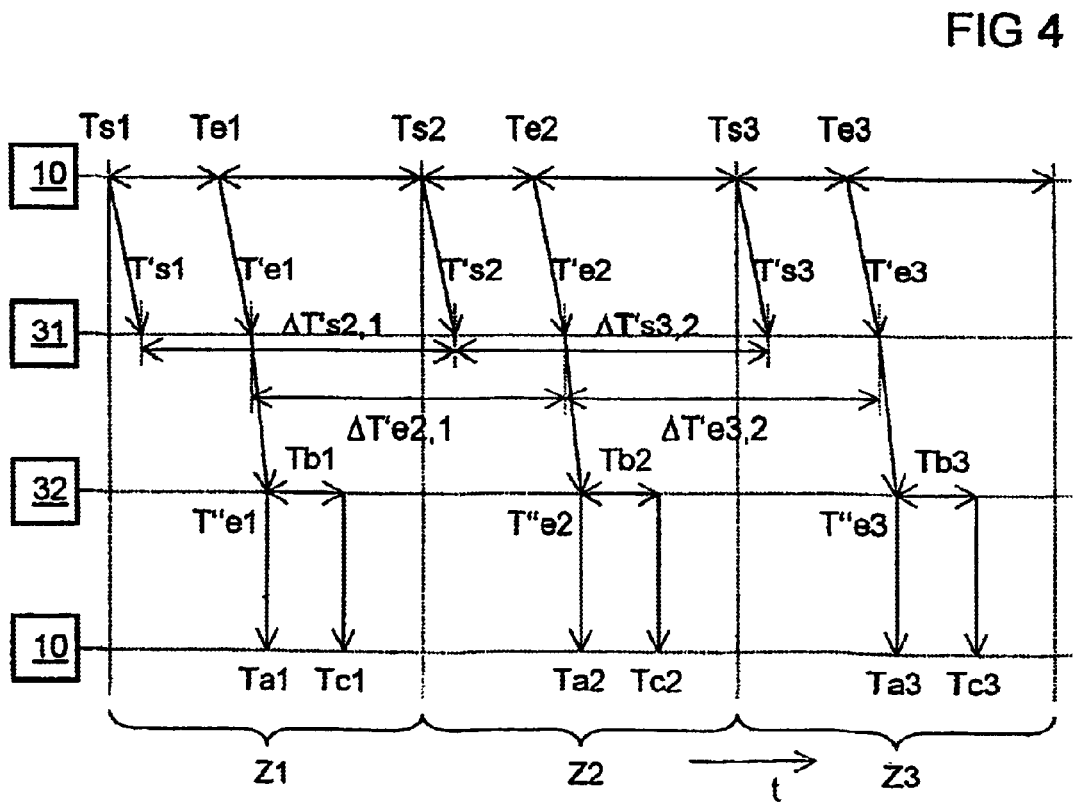
FIG. 4 is a time diagram to illustrate the interaction in the fault-free case.
Figure 5:
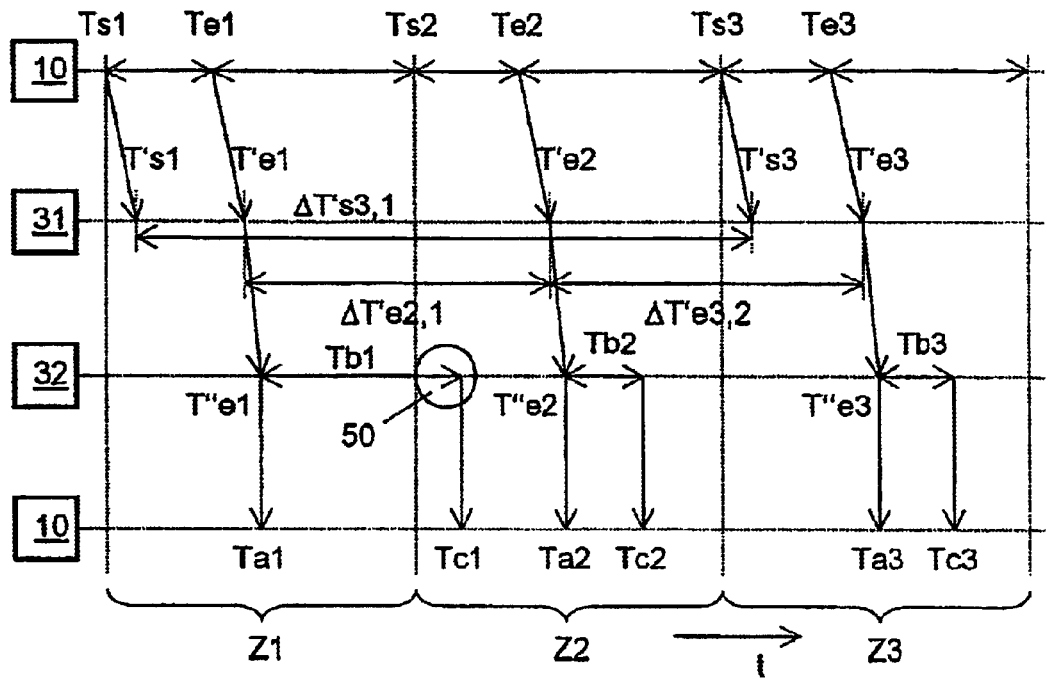
FIGS. 5 and 6 are time diagrams to illustrate the interaction in the case of faults.
Figure 6:
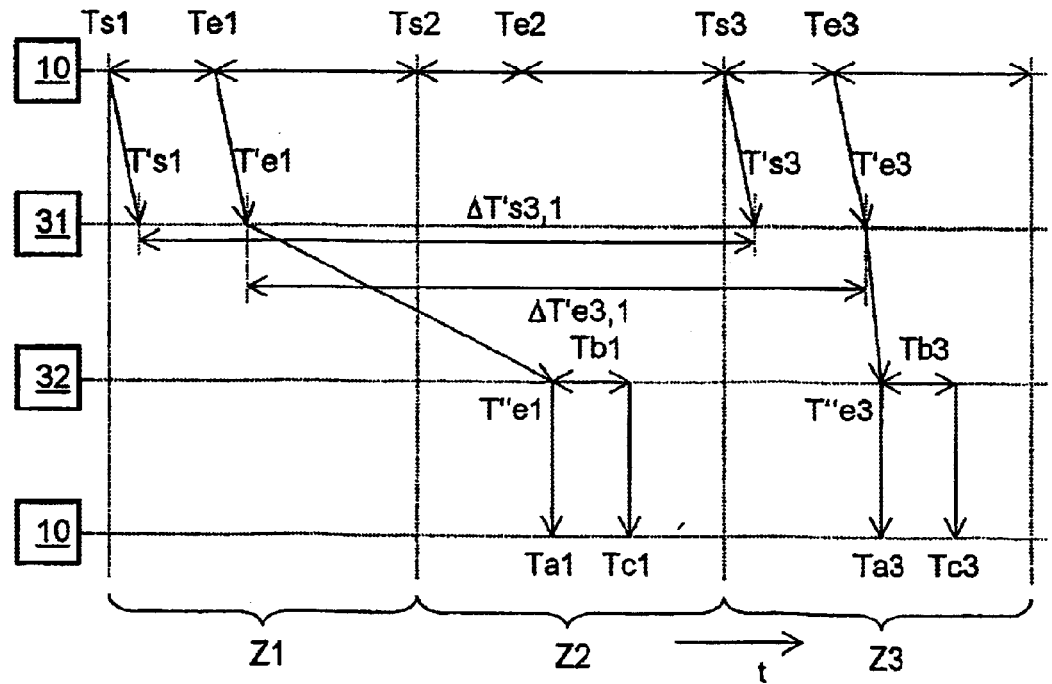

The time diagrams of FIGS. 4, 5 and 6 each show, by means of three successive cycles for the fault-free case as well as for two typical fault situations, how the access violations are detected and how the DP thread 32 and the device driver module 31 interact in detail. The position of the arrows in the different horizontal planes determines the components involved in the corresponding actions. Due to the looped basic structure, one component, namely the communications processor 10, is assigned two planes for the sake of clarity. A time axis t extends from the left side to the right side of each of the figures. For the sake of clarity, the cycles Z1, Z2 and Z3 are represented only by instants Ts1, Ts2, Ts3 and Te1, Te2, Te3 of their cycle start interrupts and cycle end interrupts.

FIG. 4 shows the following sequence. The communications processor 10 triggers a cycle start interrupt at each instant Ts1, Ts2 and Ts3 and a cycle end interrupt at each instant Te1, Te2, Te3. Due to the run times in the PC, these interrupts are signaled with a time delay to device driver module 31. The moments when the signals arrive are identified in FIG. 4 with T's1, T's2 and T's3 or T'e1, T'e2 and T'e3. Using each of these moments, the device driver module 31 determines the duration between the arrival of two interrupts of the same type. For example, a time interval $\Delta T's2,1$, which corresponds to the difference of instants T's2 and T's1 when the cycle start interrupts of cycles Z2 and Z1 arrive, is determined as $\Delta T's2,1=T's2-T's1$. The other time intervals $\Delta T's3,2$, $\Delta T'e2,1$ and $\Delta T'e3,2$ are determined analogously. At each moment T'e1, T'e2 and T'e3, when the cycle end interrupts of cycles Z1, Z2 or Z3 arrive at the device driver module 31, the device driver module 31 activates the waiting DP thread 32, e.g., by setting a common Windows semaphore. Due to the program run times in the PC, this activation also occurs with a certain time delay at instants T"e1, T"e2 and T"e3. The DP thread 32 then carries out the following actions:

1. At instants Ta1, Ta2 and Ta3 in cycles Z1, Z2 or Z3 the cycle end interrupt for the communications processor 10 is released, so that a new cycle end interrupt can be triggered again in the respectively next cycle,
2. During time intervals Tb1, Tb2 and Tb3, the DP thread 32 accesses the process image in the dual port RAM of the communications processor 10 to read input data of the slaves connected to the field bus, to evaluate these data according to its control algorithm, and to write in new output data, and
3. The DP thread 32 releases cycle start interrupts at instants Tc1, Tc2 and Tc3 for the communications processor 10, so that the processor 10 can output a new cycle start interrupt in the respectively next cycle.

As an alternative thereto, actions 1 and 3 can also both be executed after action 2.

Unauthorized access is detected by checking the time intervals $\Delta T'sx,x-1$ and $\Delta T'ex,x-1$, where x=1, 2, 3 .... If a time interval is greater than the configured equidistant time TDP plus a tolerance, then an unauthorized access is detected and signaled. If the measured time intervals have the value zero this is also indicative of an access without access authorization. The added tolerance is a value for the allowable tolerance of the measured time interval compared to the configured equidistant value. In the fault-free case depicted in FIG. 4, every access by the DP thread 32 occurs in the acyclic part of the cycle. The determined time intervals lie within the allowable range.

FIG. 5 shows an example of successive cycles in which access of the DP thread 32 to the dual port RAM during time interval Tb1 lasts too long. A portion of the access to the dual port RAM occurs in the acyclic part of cycle Z1, the remaining portion, however, lies in the cyclic part of the subsequent cycle Z2. This remaining portion thus represents an access without access authorization. This access violation is marked with a circle 50 in FIG. 5. It has the effect that the DP thread 32 releases the cycle start interrupt only at an instant Tc1, i.e., too late. Thus, the communications processor 10 cannot output a cycle start interrupt at instant Ts2 in cycle Z2, and only in cycle Z3 can the communications processor 10 generate and output a cycle start interrupt again at instant Ts3. The time interval $\Delta T's3,1$ determined by device driver module 31 is twice the configured equidistant time TDP and thus lies far outside the allowable range. The device driver module 31 reliably detects the access violation by checking this time interval so that, by signaling this fault and introducing suitable fault handling, it is possible to avoid serious consequences of the fault in a technical process that is to be controlled.

FIG. 6 shows an example of three cycles Z1, Z2 and Z3 where activation of the DP thread is delayed too long, for example due to displacement effects in the PC. Because of this delay, the acyclic part of cycle Z1 is skipped completely and access by DP thread 32 occurs only in the acyclic part of cycle Z2. Access is thus delayed by approximately an equidistant time TDP. This does not jeopardize data consistency but is not allowable from a control point of view. As a consequence of the delayed access, DP thread 32 does not release the cycle start interrupt and cycle end interrupt of cycle Z2 early enough before instants Ts2 or Te2. As a result, the communications processor 10 does not output any interrupts at these instants. Interrupts are output again only at instants Ts3 and Te3 in cycle Z3. In the device driver module 31, the duration between two interrupts of the same type is determined using the time interval ΔT's3,1 or the time interval ΔT's3,1, which are twice the configured equidistant time TDP and thus are again outside the allowable range. In this case, too, an access outside the allowable range, i.e., an access without access authorization, is reliably detected and suitable fault handling measures can be introduced.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Method for operating a user terminal in a network wherein data is transmitted in equidistant cycles, the network having a user terminal with a communications processor and with an arithmetic unit that accesses memory, comprising:

the communications processor performing the cyclic data transmission by either or both (i) reading the data from a memory in a cyclic part (ZYK,x) of each of the cycles (Z,x) and transmitting the read data to other user terminals or (ii) receiving the data from other user terminals and writing this data into a memory;

the communications processor sending at least a first synchronization signal (16) respectively at a fixed instant (Tsx) of each cycle (Z,x) to the arithmetic unit, the arithmetic unit being configured to release the first synchronization signal;

blocking the first synchronization signal (16) after the first synchronization signal has been sent, and the arithmetic unit releasing the first synchronization signal only when the arithmetic unit fails to access the memory within the cyclic part (ZYK,x);

determining a time interval (ΔT'sx,x−1; ΔT'ex,x−1) between two successive first synchronization signals; and detecting and signaling an access without access authorization if the time interval is greater than a duration (TDP) of each cycle (Z,x).

2. Method as claimed in claim 1, wherein the network is configured according to Profibus DP specification.

3. Method as claimed in claim 1, wherein the communications processor sends the first synchronization signal (16) by outputting an interrupt (ZSI,x) to the arithmetic unit at the start of the cyclic part (ZYK,x) of each cycle (Z,x).

4. Method as claimed in claim 3, further comprising:

the communications processor sending a second synchronization signal (16) by outputting a second interrupt (ZEI,x) of a second type that differs from the type of the first interrupt (ZSI,x), to the arithmetic unit at the end of the cyclic part (ZYK,x) of each cycle (Z,x);

the arithmetic unit releasing the first interrupt (ZSI,x) and the second interrupt (ZEI,x) after completing access to the memory; and determining a further time interval (ΔT'ex,x−1) between two successive interrupts of the second type; and detecting and signaling an access without access authorization if the further time interval is greater than a duration (TDP) of each cycle.

5. User terminal for a network wherein data is transmitted in equidistant cycles, comprising:

a communications processor (10) that carries out the cyclic data transmission by reading the data from a memory (15) in a cyclic part of the cycle and transmitting the read data to other user terminals, or by receiving the data from other user terminals and writing this data into a memory (14); and an arithmetic unit (5, 7, 8) that accesses the memory (14, 15);

wherein the communications processor is configured to send a synchronization signal at a fixed instant of the cycle to the arithmetic unit, and the arithmetic unit is configured to release the synchronization signal;

wherein the user terminal is configured to block the synchronization signal after the synchronization signal has been sent and to release the synchronization signal through the arithmetic unit only if the arithmetic unit does not access the memory (14, 15) within the cyclic part; and wherein the user terminal is further configured to determine a time interval between two successive ones of the synchronization signals and to detect and signal an access without access authorization if this time interval is greater than the duration of the cycle.

6. User terminal as claimed in claim 5, wherein the network is a Profibus DP network.

7. A program product, comprising:

a storage medium; and instructions that are stored on the storage medium and that are adapted to execute in a user terminal of a network in which data is transmitted in equidistant cycles, the user terminal having a communications processor and an arithmetic unit that accesses memory, wherein execution of the instructions causes:

the communications processor to perform the cyclic data transmission by either or both (i) reading the data from a memory in a cyclic part (ZYK,x) of each of the cycles (Z,x) and transmitting the read data to other user terminals or (ii) receiving the data from other user terminals and writing this data into a memory;

the communications processor to send a synchronization signal (16) at a fixed instant (Tsx) of the cycle (Z,x) to the arithmetic unit, and the arithmetic unit to release the synchronization signal;

the synchronization signal (16) to be blocked after the synchronization signal has been sent, and the arithmetic unit to release the synchronization signal only when the arithmetic unit fails to access the memory within the cyclic part (ZYK,x);

a time interval (ΔT'sx,x−1; ΔT'ex,x−1) between two successive first synchronization signals to be determined; and an access without access authorization to be detected and signaled if the time interval is greater than a duration (TDP) of the cycle (Z,x).

* * * * *